United States Patent [19]

Fukui et al.

[11] Patent Number: 6,009,490
[45] Date of Patent: Dec. 28, 1999

[54] SYSTEM HAVING PLURALITY OF NODES WITH RESPECTIVE MEMORIES AND AN ARBITER FOR PERFORMING ARBITRATION OF CONNECTION LINE USE FOR TRANSFER OF DATA BETWEEN NODES

[75] Inventors: Toshiyuki Fukui, Kawasaki; Atsushi Date, Tokyo; Kazumasa Hamaguchi; Masato Kosugi, both of Yokohama, all of Japan

[73] Assignee: Canon Kabushiki Kaisha, Tokyo, Japan

[21] Appl. No.: 08/915,318

[22] Filed: Aug. 20, 1997

Related U.S. Application Data

[63] Continuation of application No. 08/341,876, Nov. 15, 1994, abandoned.

[30] Foreign Application Priority Data

Nov. 17, 1993 [JP] Japan .................................. 5-288271

[51] Int. Cl.⁶ .................................................. G06F 13/38
[52] U.S. Cl. .......................... 710/113; 710/4; 710/100; 710/107; 710/241; 359/123
[58] Field of Search ............................ 395/200.3, 821; 711/147

[56] References Cited

U.S. PATENT DOCUMENTS

| | | | |
|---|---|---|---|
| 3,470,542 | 9/1969 | Trantanella | 365/230.03 |
| 4,654,788 | 3/1987 | Boudreau et al. | 395/287 |
| 4,710,769 | 12/1987 | Friedman et al. | 340/825.03 |
| 4,716,523 | 12/1987 | Burrus, Jr. et al. | 395/848 |
| 4,866,702 | 9/1989 | Shimizu et al. | 370/60 |
| 4,868,742 | 9/1989 | Gant et al. | 395/850 |
| 4,901,226 | 2/1990 | Barlow | 395/302 |
| 5,142,682 | 8/1992 | Lemay et al. | 395/731 |
| 5,144,557 | 9/1992 | Wang et al. | 707/9 |
| 5,239,651 | 8/1993 | Sodos | 395/729 |
| 5,253,343 | 10/1993 | Grave | 395/293 |
| 5,265,103 | 11/1993 | Birghtwell | 371/32 |

(List continued on next page.)

FOREIGN PATENT DOCUMENTS

| | | |
|---|---|---|
| 0308890 | 9/1988 | European Pat. Off. . |
| 0444207 | 9/1990 | European Pat. Off. . |

OTHER PUBLICATIONS

Discovering A New World Of Communications, Jun. 14–18, 1992, vol. 2 of 4, Jun. 14, 1992, Institute of Electrical and Electronics Engineers, pp. 824–828, Willner et al., "Comparison of Central and Distributed Control In A WDMA Star Network".

IEEE Communications Magazine, vol. 27, No. 10, Oct. 1, 1989, pp. 27–35, Goodman, "Multiwavelength Networks And New Approaches To Packet Switching".

*Primary Examiner*—Thomas C. Lee
*Assistant Examiner*—Chien Yuan
*Attorney, Agent, or Firm*—Fitzpatrick, Cella, Harper & Scinto

[57] ABSTRACT

An information processing apparatus has a plurality of nodes, a connection line for connection between the plurality of nodes, an arbiter for performing arbitration of use of the connection line, and an arbitration signal line for connection between the arbiter and each node, wherein the arbiter performs processing of a request for use of the connection line and processing of additional information related to data transfer executed after connection of the connection line. An arbitration method in the information processing apparatus includes steps of letting a node originating a request for use of the connection line, when requesting use of the connection line to the arbiter, also send additional information related to data transfer on the connection line together with the request for use to the arbiter; and letting the arbiter, when performing arbitration of use of the connection line to set the connection line based on the request, send the additional information related to the data transfer to a node being to receive the request.

49 Claims, 13 Drawing Sheets

U.S. PATENT DOCUMENTS

| | | | |
|---|---|---|---|
| 5,289,302 | 2/1994 | Eda | 359/123 |
| 5,299,196 | 3/1994 | Allen, Jr. | 370/85.1 |
| 5,400,163 | 3/1995 | Mizouchi et al. | 359/124 |
| 5,438,665 | 8/1995 | Taniai et al. | 395/845 |
| 5,457,688 | 10/1995 | Andersen | 370/85.5 |
| 5,566,306 | 10/1996 | Ishida | 395/309 |
| 5,592,625 | 1/1997 | Sandberg | 711/147 |

SYSTEM HAVING PLURALITY OF NODES WITH RESPECTIVE MEMORIES AND AN ARBITER FOR PERFORMING ARBITRATION OF CONNECTION LINE USE FOR TRANSFER OF DATA BETWEEN NODES

This application is a continuation of application Ser. No. 08/341,876 filed Nov. 15, 1994 now abandoned.

BACKGROUND OF THE INVENTION

1. Field of the Invention

The present invention relates principally to an information processing apparatus consisting of a plurality of nodes, each having at least a processor and a memory, and a connection line for connecting the nodes.

2. Related Background Art

For connecting a plurality of information processing apparatus (each of which will be called as a node in the present application), each of which has at least one processor and one memory for the purpose of data exchange between nodes, there are a method to connect them using one of various types of LANs and a method to connect them at address level of memory without using a LAN.

In these cases, an arbiter is generally provided for avoiding a conflict of access to a connection line between nodes and performing arbitration of a right of use of the connection line. Receiving connection line setting information from the arbiter, two nodes set up a connection line based on the information and exchange address information and the like through the set line, thereafter performing actual data transmission. FIG. 1 shows an example of the system for performing such an operation and FIG. 2 shows a timing chart to show a flow of the processing in that case.

In FIG. 1, reference numerals 100, 200, and 300 designate nodes, which are connected by a connection line 10. Each node includes a CPU 101, 201, 301, a memory 102, 202, 302, an interface circuit 103, 203, 303 for connection between the connection line 10 and the inside of each node, an arbitration interface circuit 104, 204, 304 used in requesting use of the connection line 10, and an internal bus 105, 205, 305 for interconnection between the listed internal components in node. Numeral 20 denotes an arbiter for performing arbitration of use of the connection line 10. The arbiter 20 is connected with each node by an arbitration signal line 110, 210, 310. Inside the arbiter there is a line selection information managing apparatus 21 for managing line request information sent from each node.

FIG. 2 shows an example where CPU 101 on node 100 reads data in memory 202 on node 200. In the timing chart as shown in FIG. 2, the horizontal axis represents lapse of time, an arrow a flow of signal and control, a rectangle a process executed in each processing apparatus, and a hexagon a state in which a variety of information is present for transmission on the internal bus, the connection line, or the arbitration signal line. Phases in the processing will be described one by one.

Phase 1

CPU 101 on node 100 issues an address on the common bus 105. Detecting it, the arbiter interface 104 notifies the arbiter 20 of the request for use of the connection line 10 through the signal line 110.

Phase 2

The arbiter 20 compares the request from node 100 with current circumstances of use of the connection line stored in the line selection information managing apparatus 21 and with circumstances of node 200 as a destination to be connected with, and notifies the node 200 of the connection request through the signal line 210 when it determines that they can be connected with each other.

Phase 3

Receiving the connection request from the arbiter 20, the node 200 immediately secures a circuit in the connection line interface 203 to the connection line 10. After completion of bus processing inside the node and when it becomes ready to receive a request from an external node, the node 200 sends a response of authorization of connection through the signal line 210 to the arbiter 20. Receiving the response, the arbiter 20 informs the node 100 of the authorization of line setting through the line 110. The arbiter interface 104 in node 100 gives an instruction of line setting to the connection line interface 103, based on the received information.

Phase 4

The node 100 sends an address of requested data from the connection line interface 103, onto the line 10. Based on the received address from node 100, the node 200 accesses the memory 202 through the internal bus 205.

Phase 5

The node 200 sends data supplied from memory 202 through the connection line interface 203 onto the connection line 10, and the node 100 receives it through the connection line interface 103. The received data is provided to CPU 101 through the internal bus 105 in node 100.

As described above, the data transfer was executed by successively processing the above phases.

However, where the data transfer is executed by successively processing the phases as shown in FIG. 2, i.e., in the case where the connection line is first set up, then the address information or the like is exchanged through the set line, and thereafter actual data transfer is carried out, overhead required for setting up the transmission line and for transmission of additional information (for example, such as address) to carry out data transfer is inevitable in addition to a time necessary for actual exchange of data, resulting in a problem of a decrease in efficiency of actual data transfer. In particular, where the time due to the overhead was long, or where the data transfer speeds on the line between nodes was slower than the processing speeds of the bus and other components in the each node, the actual data transfer efficiency was greatly lowered.

SUMMARY OF THE INVENTION

The present invention has been accomplished to solve the above problems, and an object of the invention is to enable overlap of the line setting processing in the respective nodes and preparation of data transfer in the nodes, thus improving the transfer efficiency in the actual data transfer phase.

For that, the present invention provides the following information processing apparatus and arbitration method.

An information processing apparatus having a plurality of nodes, comprises:
 a connection line for connection between said plurality of nodes;
 an arbiter for performing arbitration of use of said connection line; and
 an arbitration signal line for connection between said arbiter and each node;
wherein said arbiter performs processing of a request for use of said connection line and processing of additional information related to data transfer executed after connection of the connection line.

An arbitration method in an information processing apparatus having a plurality of nodes, a connection line for connection between said plurality of nodes, an arbiter for performing arbitration of use of said connection line, and an arbitration signal line for connection between said arbiter and each node, comprises steps of:

letting a node originating a request for use of the connection line, when requesting use of the connection line to the arbiter, also send additional information related to data transfer on said connection line together with said request for use to the arbiter; and letting the arbiter, when performing arbitration of use of the connection line to set the connection line based on said request, send said additional information related to the data transfer to a node which is to receive said request.

DETAILED DESCRIPTION OF THE PREFERRED EMBODIMENTS

Embodiment 1

Figure 4:
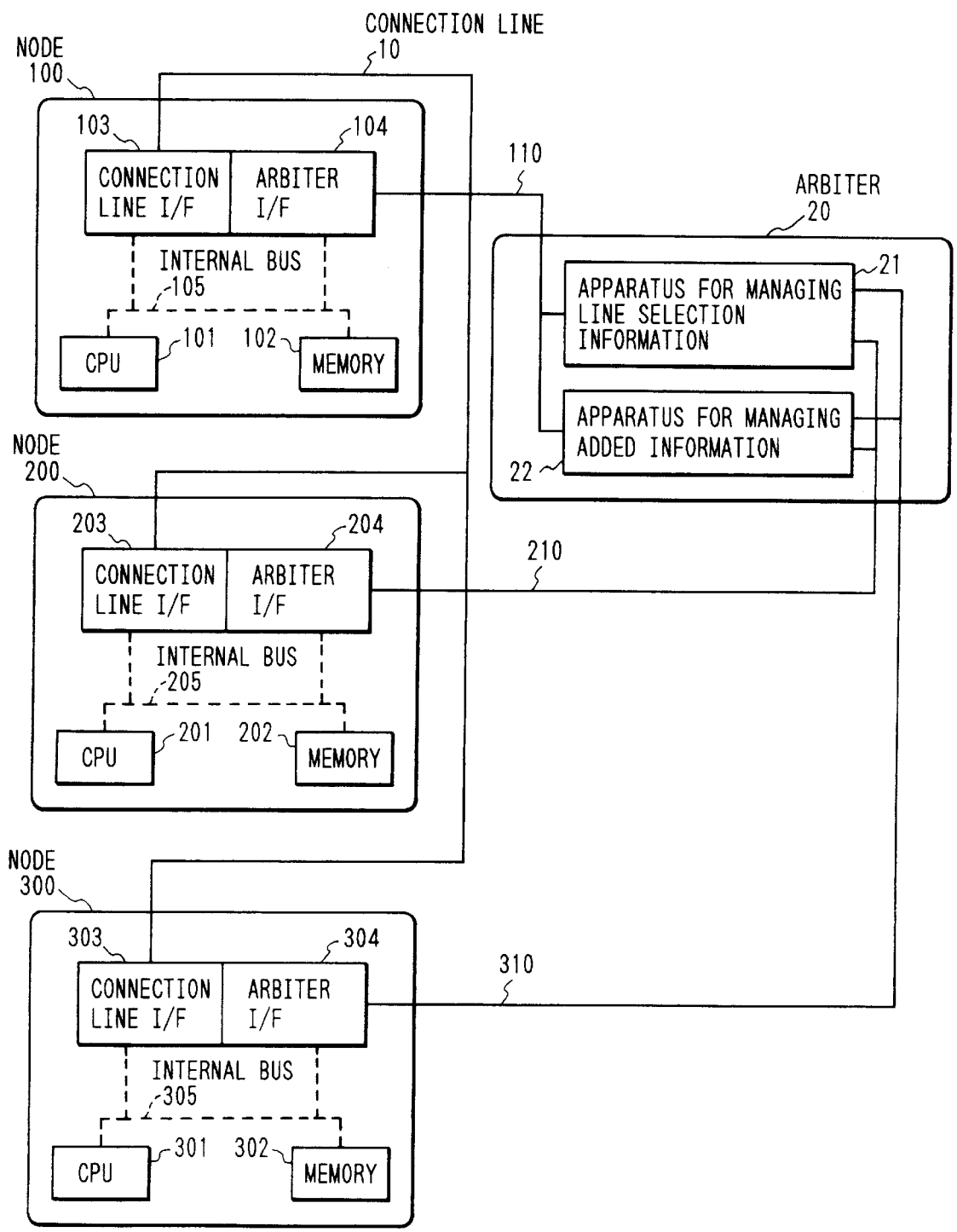
FIG. 4 is a drawing to show a layout of an embodiment of a system for realizing the present invention.

FIG. 4 is a structural drawing of an embodiment of the system for realizing the present invention.

Reference numerals 100, 200, 300 designate nodes, which are connected with each other by a connection line 10. In this case the connection line is an ordinary bus which can transmit data in parallel. Each node includes a CPU 101, 201, 301, a memory 102, 202, 302, an interface circuit 103, 203, 303 for connection between the connection line 10 and the inside of each node, an arbitration interface circuit 104, 204, 304 used in requesting use of the connection line 10, and an internal bus 105, 205, 305 for interconnecting the internal components inside each node.

The interface circuit 103, 203, 303, in this case, is composed of a buffer for driving the bus, and a control logic. The arbitration interface circuit 104, 204, 304 is composed of a buffer for driving the arbitration signal line, and a control logic for detecting and processing a request inside node. Here, this control logic can be produced as a construction including a control processor.

An arbiter for performing arbitration of use of the connection line 10 is denoted by 20, and the arbiter 20 is in one-to-one connection with each node through an arbitration signal line 110, 210, 310. The arbitration signal line 110, 210, 310 here is a bus-type parallel interface consisting of some signal lines.

Inside the arbiter there is, in addition to a line selection information managing apparatus 21 for managing line request information sent from each node, an additional information managing apparatus 22 for temporarily storing additional information to data transfer, such as an address, sent to follow the information. The apparatus 21 is composed of a micro controller consisting of ROM, RAM, and control CPU. The apparatus 22 is composed of registers and a control logic thereof. It should be, however, noted that this constitution is not limited by the present invention.

Figure 3:
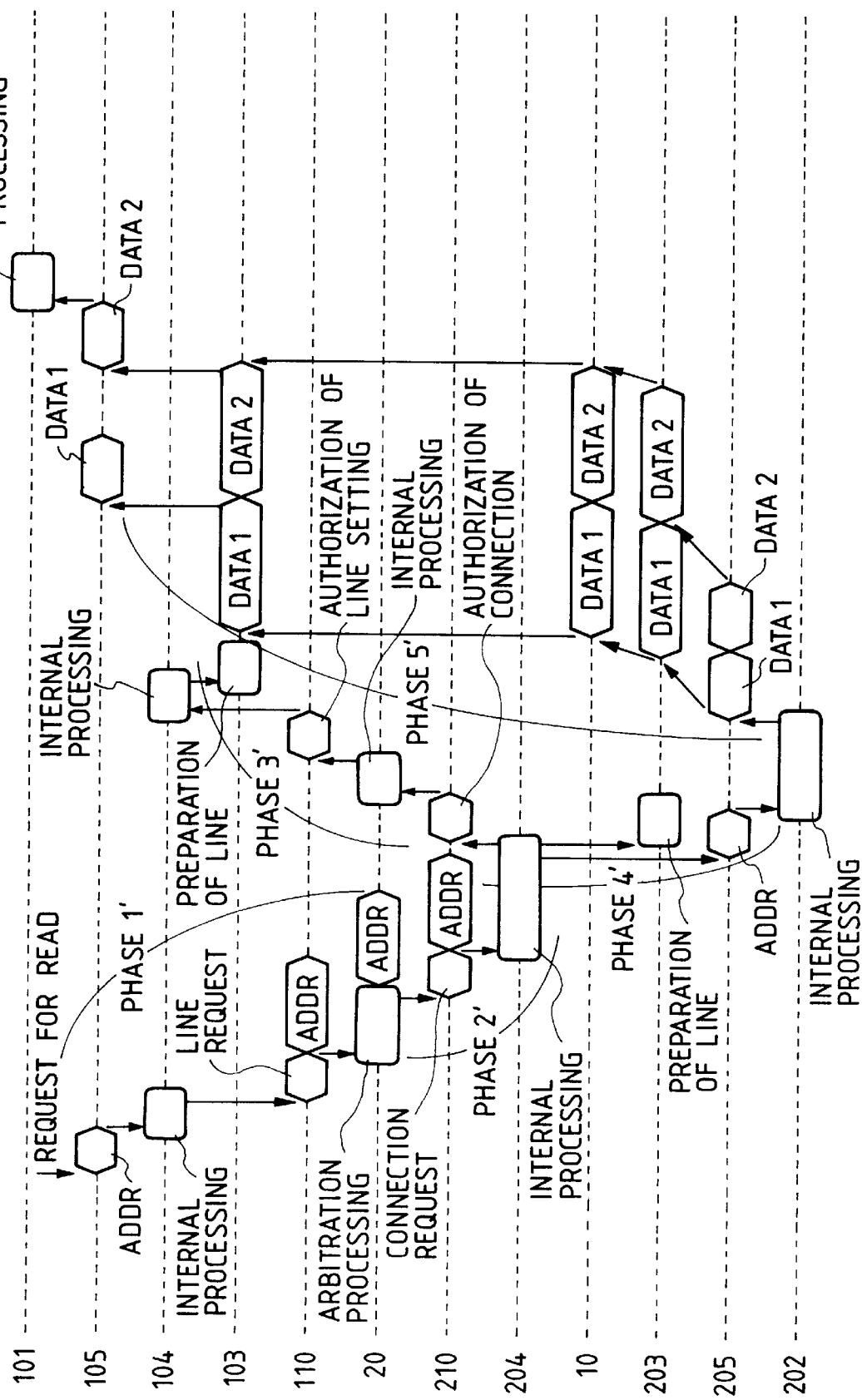
FIG. 3 is a drawing to show an example of timing chart most suitably illustrating the present invention.

FIG. 3 is a timing chart most suitably showing the present invention.

Described as an example is a case where CPU 101 on node 100 reads data in memory 202 on node 200.

Phase 1'

CPU 101 on node 100 issues an address on a common bus 105. Detecting it, the arbiter interface circuit 104 notifies the arbiter 20 of a request of use of the connection line 10 through the connection line 110. This information is taken into the request information managing apparatus 21 inside the arbiter. Subsequently, the node 100 informs the arbiter 20 of information related to the data transfer, for example, such as an address in memory 202 requested to send data thereat. The arbiter 20 takes the information into the additional information managing apparatus 22.

Phase 2'

The arbiter 20 compares the request from node 100 with current circumstances of use of the connection line stored in the line selection information managing apparatus 21 and with circumstances of node 200 requested as a destination to be connected. When it determines that they can be connected with each other, it notifies the node 200 of the connection request and the information such as the an address of the requested data stored in the additional information managing apparatus 22 through the signal line 210.

Phase 3'

Receiving the connection request from the arbiter 20, the node 200 immediately secures a circuit in the connection line interface 203 to the connection line 10 and sends a response of authorization of connection to the arbiter 20. Receiving the response, the arbiter 20 notifies the node 100 of the authorization of line setting. The node 100 receiving the notification sends an instruction from the interface 104 to the connection line interface 103 that data coming through the connection line 10 should be received, so as to become ready for reception.

Phase 4'

Receiving the additional information related to the data transfer, such as an address, through the signal line 210 from the arbiter 20, the arbiter interface 204 in node 200 sends a READ request to the memory 202 through the internal bus 205, based on the received information.

Phase 5'

The node 200 sends the data supplied from the memory 202 onto the connection line 10 through the connection line interface 203, and the node 100 receives it through the connection line interface 103. The received data is given to CPU 101 through the internal bus 105 in node 100.

Figure 1:
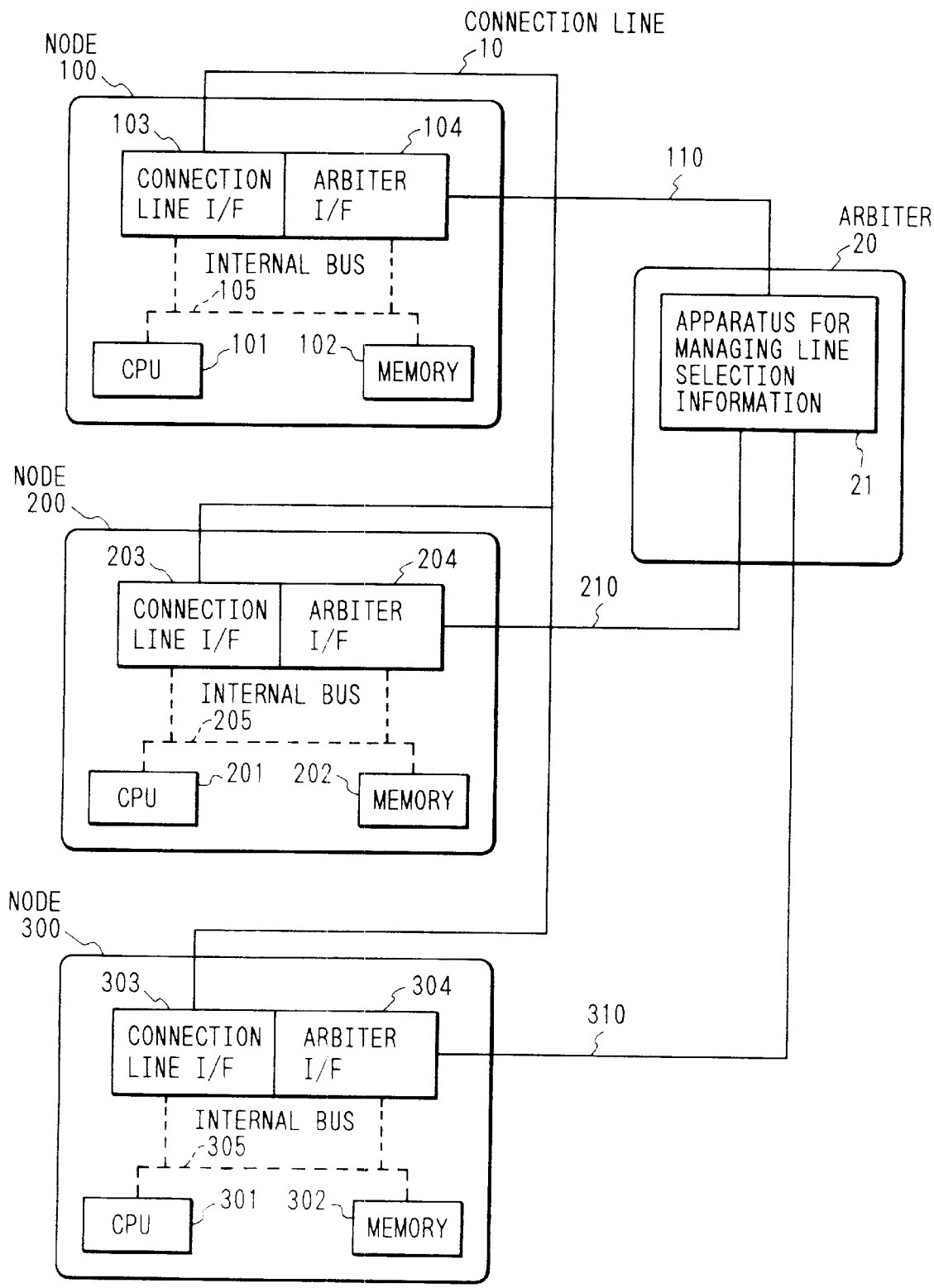
FIG. 1 is a drawing to show an example of layout of a conventional system.
Figure 2:
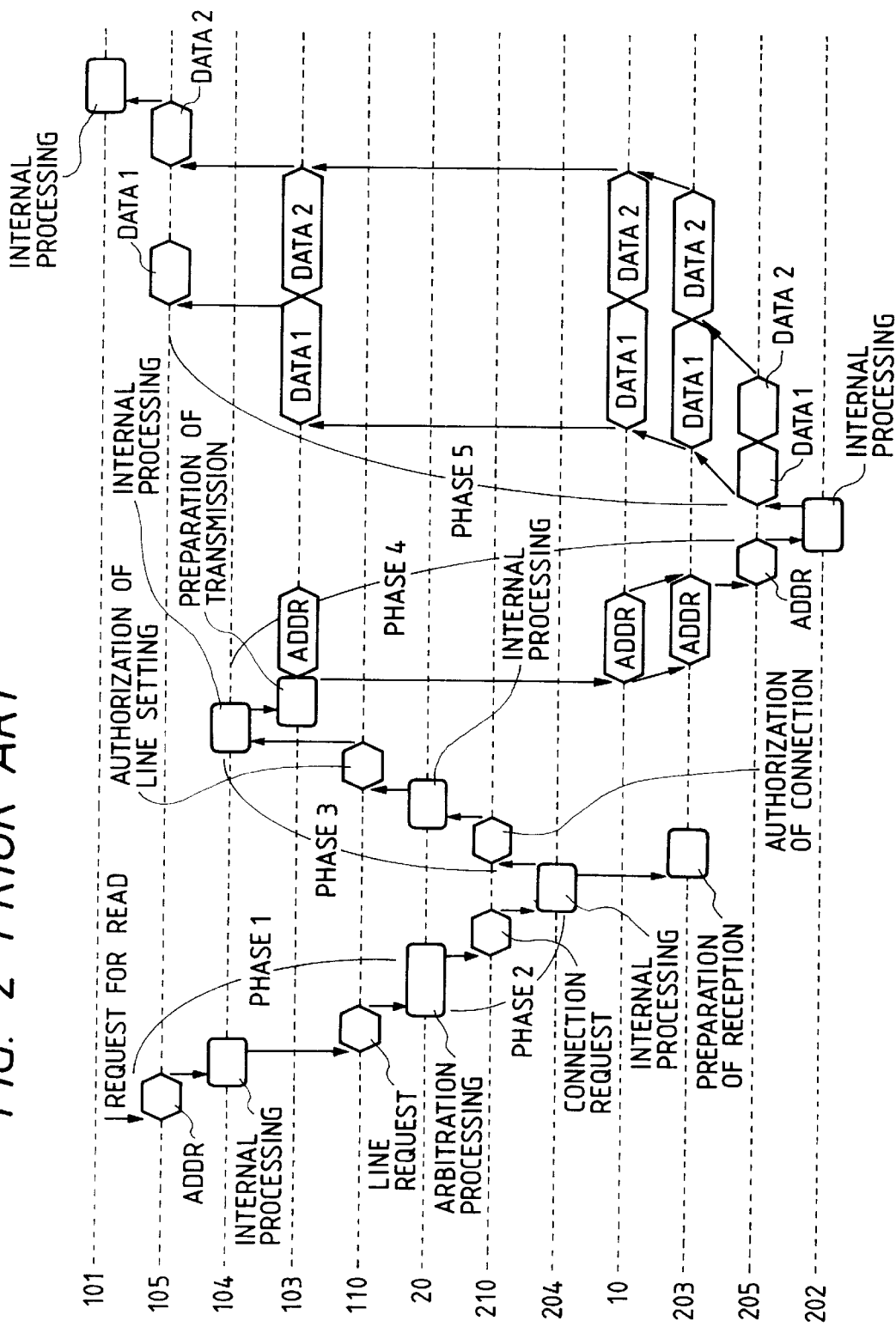
FIG. 2 is a drawing to show an example of timing chart illustrating the operation of the conventional system.

As seen from comparison of the timing chart of FIG. 3 with that of FIG. 2, Phase 3' and Phase 4' are arranged to overlap in FIG. 3, whereby the time necessary for the parts which can be processed in parallel can be reduced as compared with the case of FIG. 2.

Embodiment 2

Further, the second embodiment is described in detail using an example of a system mainly different from the previous embodiment 1 in that exchange of information between each node and the arbiter is carried out with a packet including the connection request and additional information in an incorporated manner, in which optical fibers are used to connect the respective nodes with the arbiter and each data is handled in the form of serial signals. Figures and reference numerals common to those in embodiment 1 are used herein.

The block diagram for schematically showing the total system is the same as that of FIG. 4, which will be omitted to explain herein.

Figure 5:
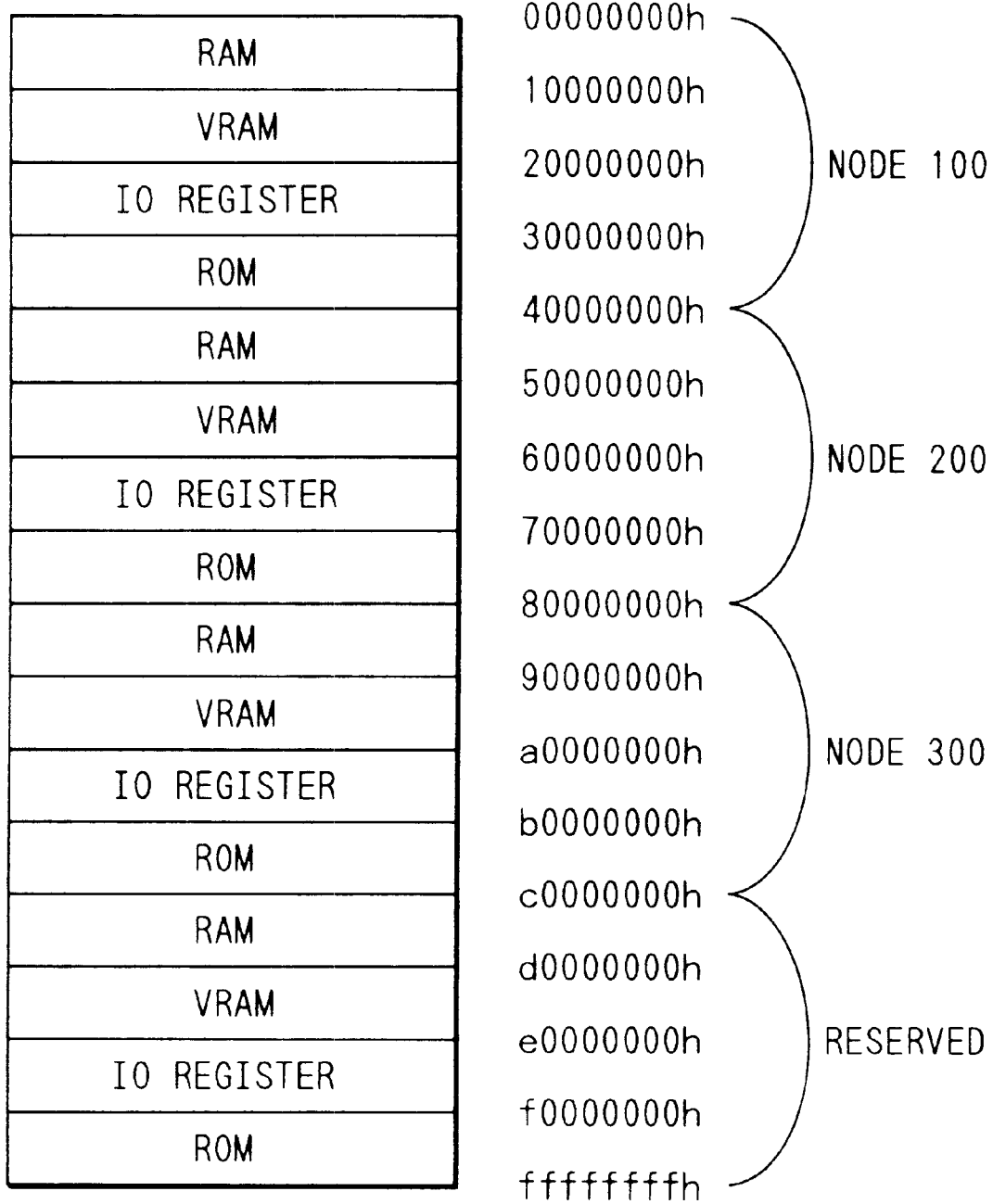
FIG. 5 is an address map of a system showing embodiment 2 of the present invention.

FIG. 5 is an address map of the entire system. In the present embodiment an address space of the entire system, 4 gigabytes, is portioned out among four portions for four nodes, among which three portions are used for three nodes.

Figure 6:
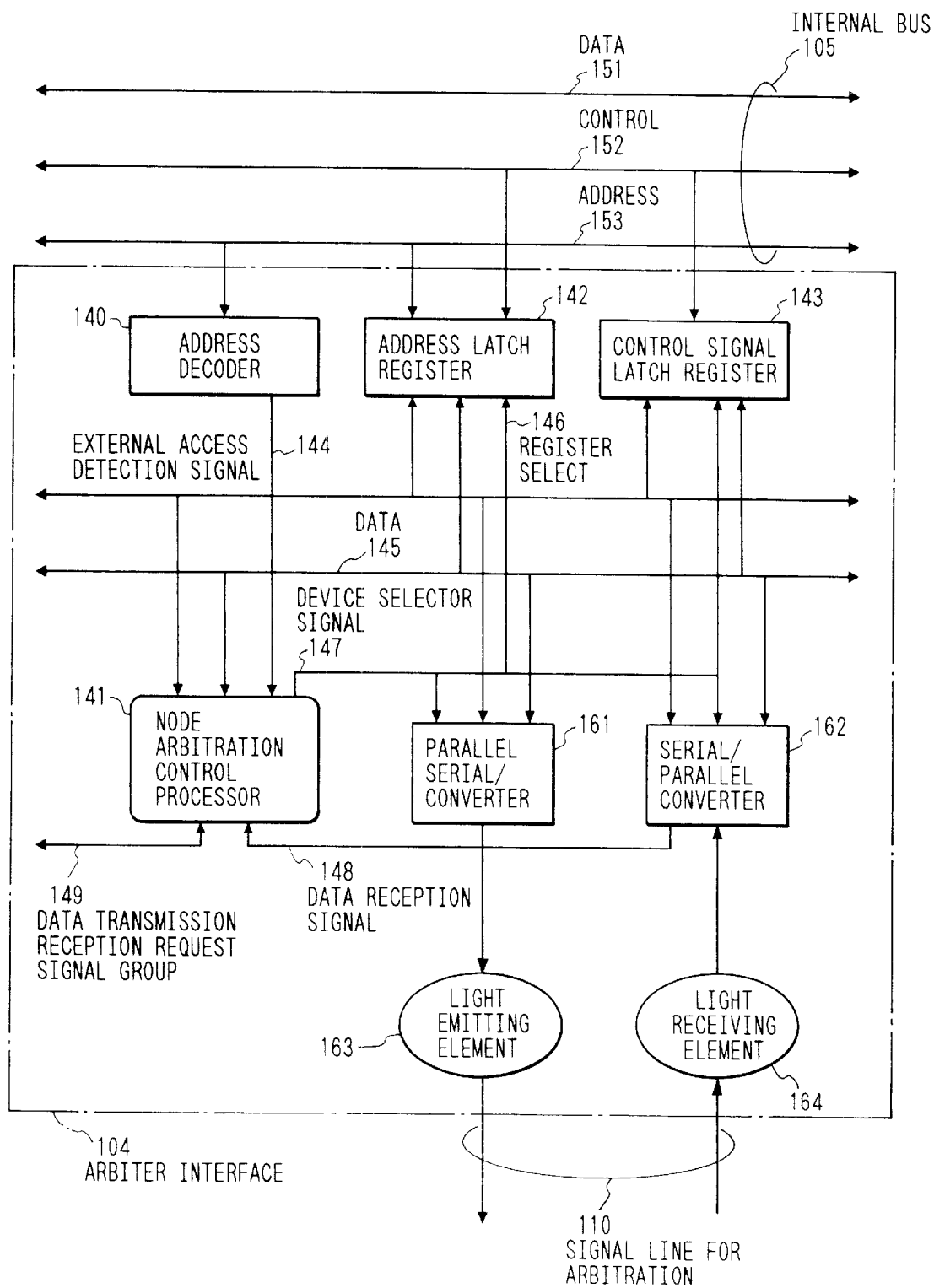
FIG. 6 is a drawing to show an arbiter interface of node in embodiment 2 of the present invention.

FIG. 6 is a block diagram of the arbiter interface 104.

An address decoder 140 provided inside the arbiter interface 104 always monitors an internal bus 105 (which is composed of a data signal line 151, a control signal line 152, and an address signal line 153) in node 100. When the address decoder 140 recognizes an access to an external node (in this case, node 200 or 300) appearing on the bus, it turns over the control to a program operating on a node arbitration control processor 141 by an external access detection signal 144. At the same time, an address latch register 142 latches an address on the address signal line 153 and a control signal latch register 143 latches control information such as a type of request of read or write or a number of transfer bytes. The node arbitration processor 141 is a 1-chip micro controller in the present embodiment, the structure of which is by no means limited by the present invention, but may be constructed of a hardware logic.

Figure 7:
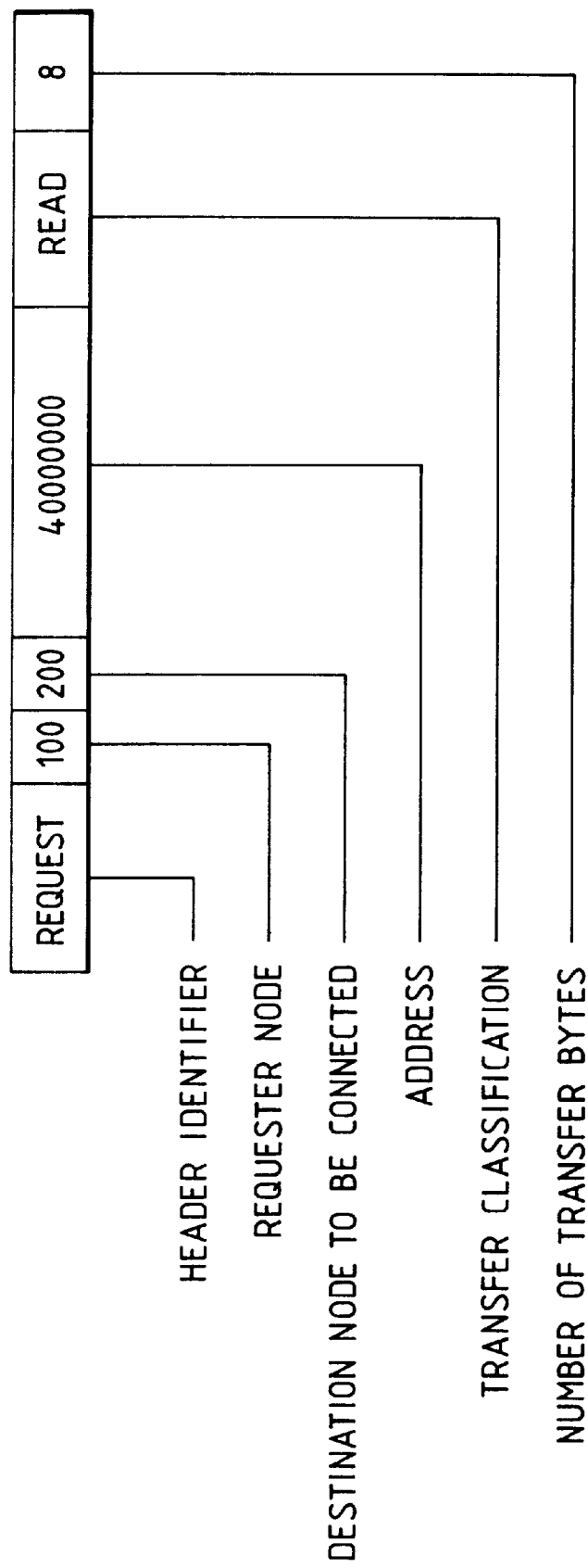
FIG. 7 is a drawing to show an arrangement of an arbitration request packet used in embodiment 2 of the present invention.

The node arbitration processor 141 reads the signals latched by the address latch 142 and control signal latch 143 to determine a destination to be connected and to produce an arbitration request packet as shown in FIG. 7, then writing it in a parallel/serial converter 161. The packet shown in FIG. 7 includes not only a line request signal but also the additional information related to the data transfer as an internal data format. The parallel/serial converter 161 converts the written information into serial data to output it to a light emitting element 163. The light emitting element photoelectrically converts the input signal into an optical signal of wavelength λ1 and sends it through a communication line 110 consisting of an optical fiber to the arbiter 20. This structure is common to all nodes. The light emitting element mentioned herein means an element such as LED or laser, and a light receiving element means an element represented by a photodiode.

Figure 8:
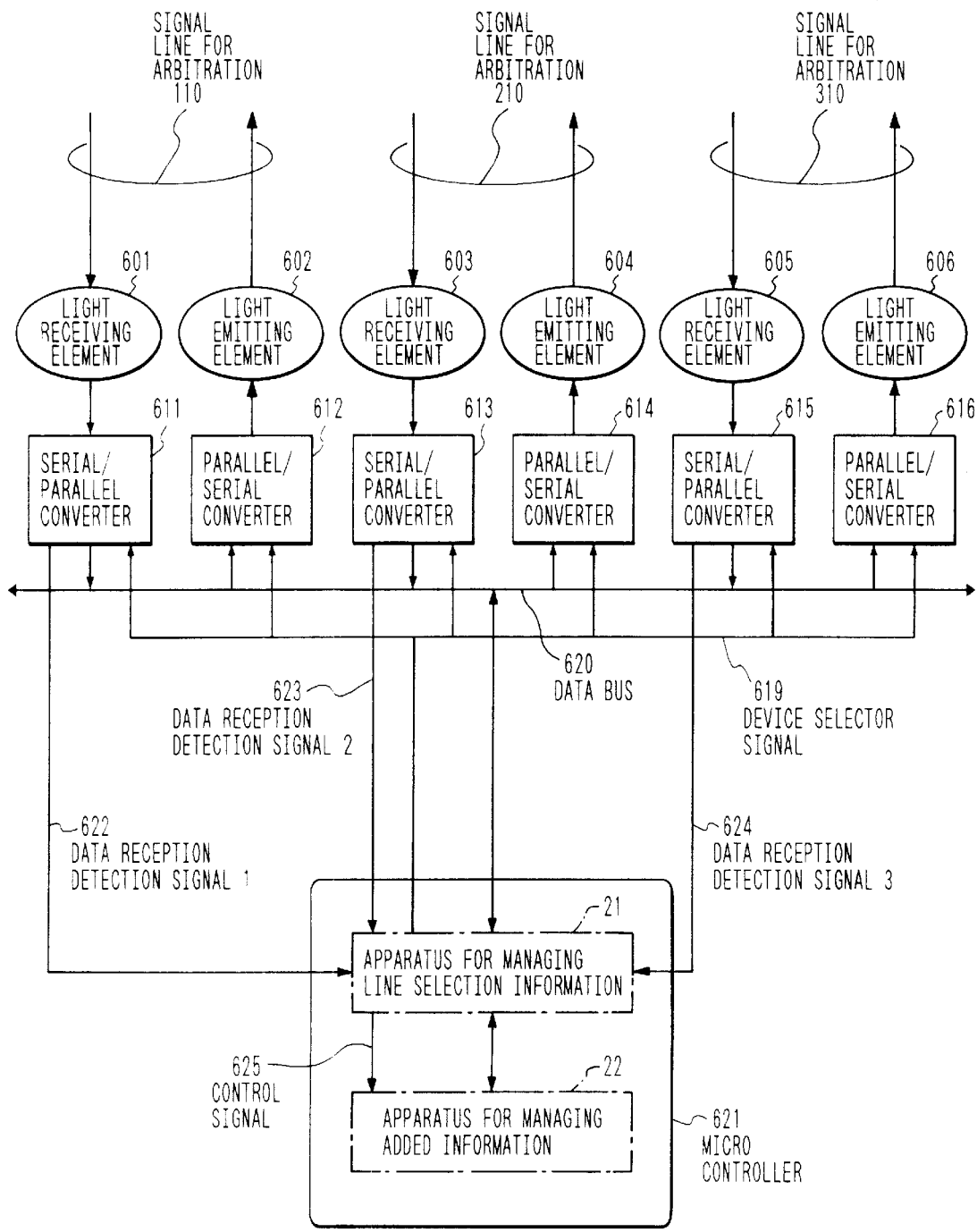
FIG. 8 is a drawing to show a layout of an arbiter in embodiment 2 of the present invention.

FIG. 8 shows a block diagram of the arbiter portion 20. Numerals 601, 603, 605 represent light receiving elements. Each element receives the optical signal of wavelength λ1 emitted from an associated node, i.e., the above arbitration request signal to convert it into an electric signal. Here, supposing the request signal from node 100 arrives to be put into a serial/parallel converter 611, the serial/parallel converter 611 converts the input serial electric signal into a parallel signal and simultaneously notifies the line selection information managing apparatus 21 of the arrival by a data reception detection signal 622. In the present embodiment the apparatus 21 is constructed of a micro controller 621 having a built-in ROM storing the program and a built-in RAM used in processing. It is also assumed that this micro controller includes a portion functioning as the additional information managing apparatus 22 at the same time. However, this structure is not limited by the present invention.

Figure 9:
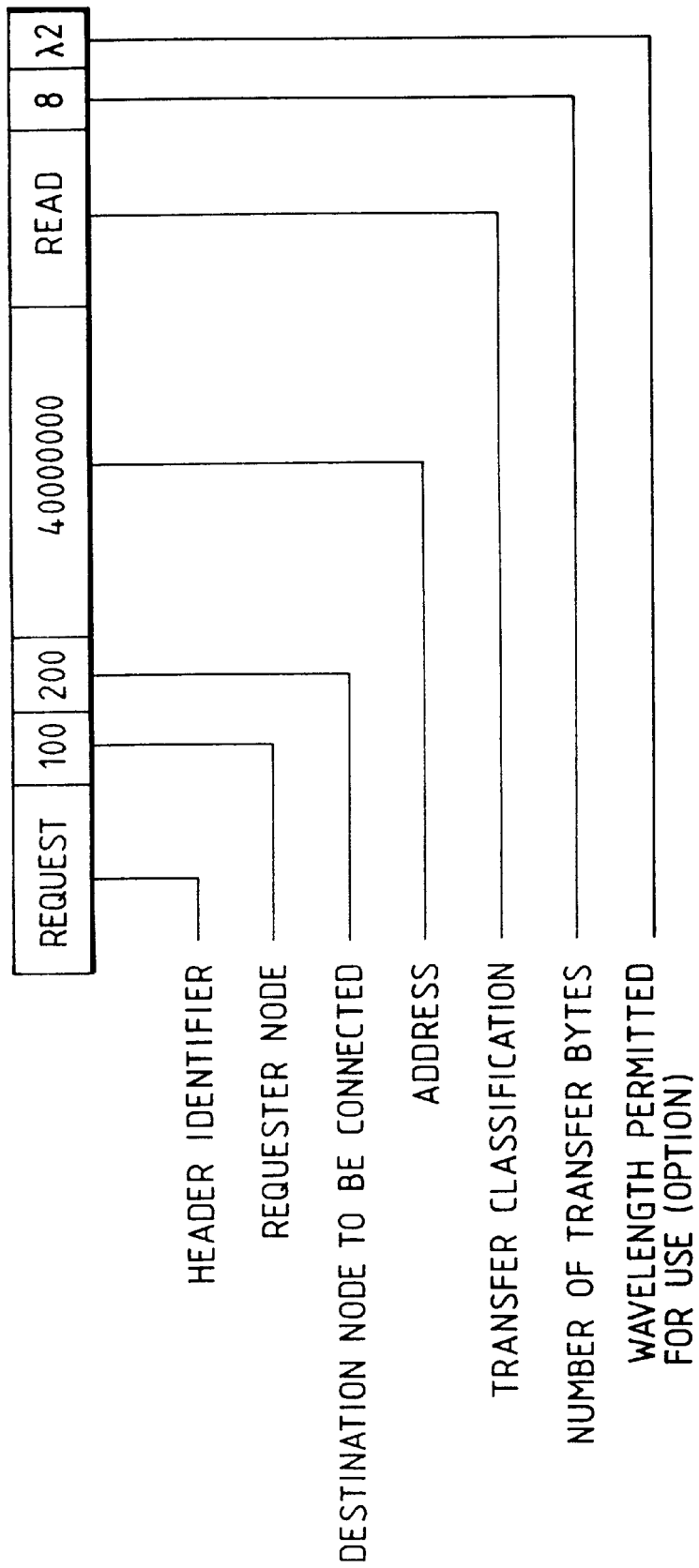
FIG. 9 is a drawing to show an arrangement of a connection preparation request packet used in embodiment 2 of the present invention.

Receiving the data reception detection signal 1 of 622, the line selection information managing apparatus 21 selects the serial/parallel converter 611 by a device selector signal 619 to read the request packet sent from the node 100, through the data bus 620 from the internal register. The request packet also includes the additional information related to the data transfer, which is stored in the portion functioning as the additional information managing apparatus 22 in the micro controller. After that, analyzing this packet and performing comparison or the like with the address map of FIG. 5, it is detected that the request for use of the transmission line is a request for connection from node 100 to node 200. Then a transmission line using state flag set in the line selection information managing apparatus is checked. If the flag indicates a usable state, the flag is changed into an in-use state. Further, the controller produces a connection preparation request packet shown in FIG. 9 to write it in parallel/serial converters 612 and 614. This connection preparation packet also includes the information supplied from the portion functioning as the additional information managing apparatus 22 in the micro controller. These two connection preparation request packets are sent to respective nodes 100 and 200, using an optical signal of λ1 similarly as in the case of the optical arbiter interface.

Again in node 100, the optical signal received through the fiber 110 is converted into an electric signal by the light receiving element 164 to be put into the optical arbiter interface 104. In the optical arbiter interface 104 the input signal is converted into a parallel signal by a serial/parallel converter 162 and at the same time the node arbitration control processor 141 is notified of the arrival of packet by a data reception signal 148. The node arbitration processor in node 100 reads the above connection preparation request packet, using a device selector signal 147 and a data bus 145, from the serial/parallel converter 162 to detect authorization of connection and gives an instruction for the connection line interface 103 to be in data reception standby, using a data transmission reception request signal 149.

This makes the node 100 ready to receive data.

On the other hand, in node 200, (the operation of node 200 is explained using FIG. 4 and FIG. 6 because the structure of the respective nodes is the same) the optical signal received through the fiber 210 (which is 110 in FIG. 6) is converted into an electric signal by the light receiving element 164 to be put into the optical arbiter interface 204. The input signal is converted into a parallel signal by the serial/parallel converter 162 and at the same time, the node arbitration control processor 141 is notified of the reception by the data reception signal 148. Detecting the notification, the node arbitration processor in node 200 reads the above connection preparation request packet from the serial/parallel converter 162, using the device selector signal 147 and data bus 145, and requests authorization of use of the internal bus 205 to the inside of node. Receiving authorization of use of the internal bus, the node arbitration control processor uses the data transmission reception request signal group 149 to give an instruction for the connection line interface 203 to read data based on the contents of the packet of FIG. 9 and to output it to node 100.

Figure 10:
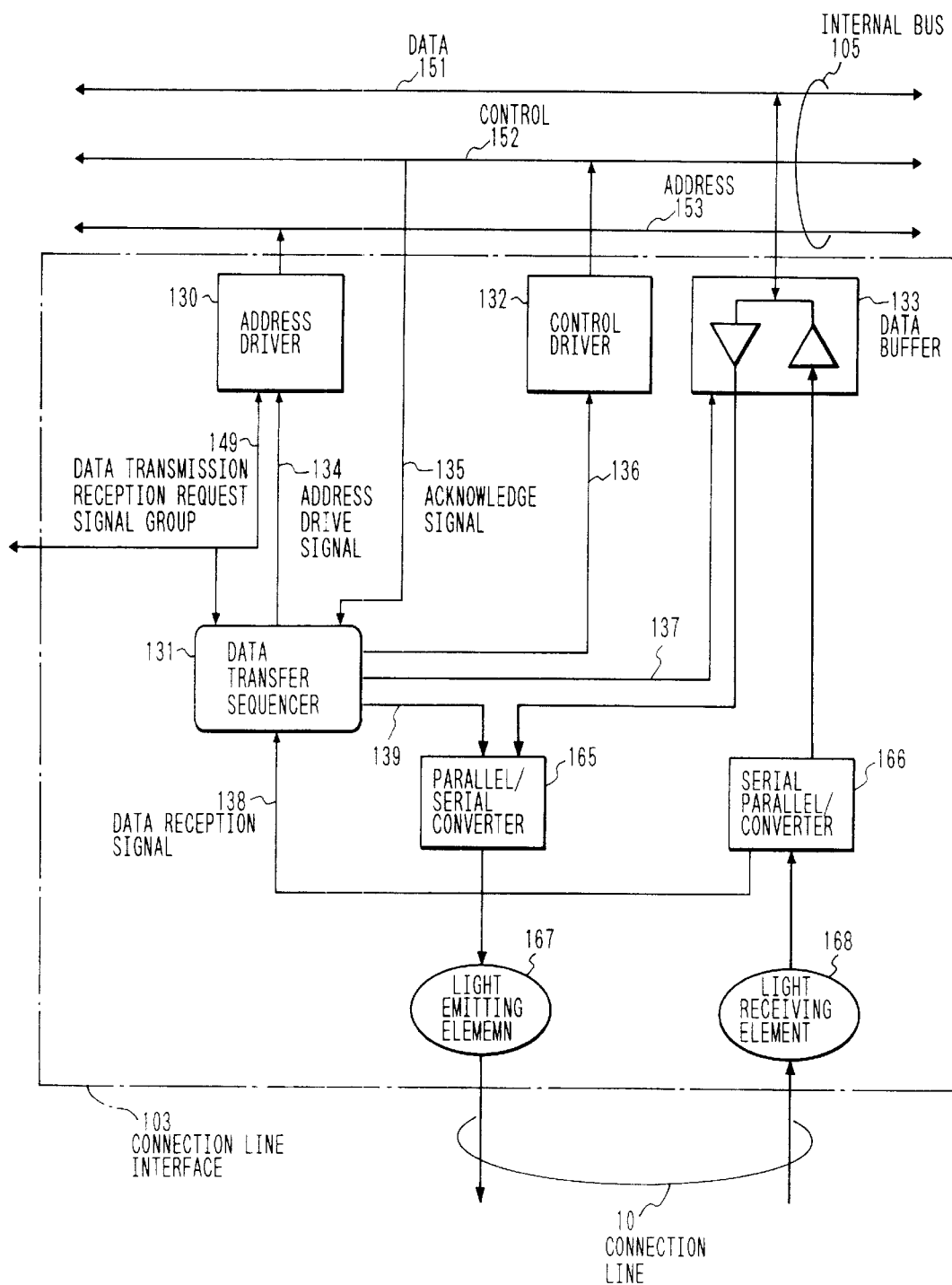
FIG. 10 is a drawing to show a layout of a connection line interface portion in embodiment 2 of the present invention.

FIG. 10 shows an example of the connection line interface portion where an optical fiber is used as the connection line. Here, the data transmission reception request signal 149 sent from the arbiter interface gives the address to an address driver 130 and an instruction of read request to a data transfer sequencer 131.

The sequencer 131 gives an instruction of drive of address to the address driver by a signal 134 and then gives an instruction to the control driver 132 through a signal line 136 about drive of control signals such as transfer size, read-write signal, etc. to bus. This generates transaction of normal memory read on the internal bus in node. The memory controller drives the data in response to the request and then drives an acknowledge signal 135. Receiving the acknowledge signal 135, the data transfer sequencer gives an instruction of conversion start request to the parallel/serial converter 165, using a signal 139, and thereafter returns into an idle state.

An electricity-light conversion is performed in the serially converted signal such that the serially converted signal is converted into an optical signal in the wavelength of $\lambda 2$ by the light emitting device 167 to be output to the node 100.

In node 100, the optical signal of $\lambda 2$ is converted into an electric signal by the light receiving device 168, which is put into the connection line interface 103. The following describes following part of the processing in node 100, referring to FIG. 6 and FIG. 10. In node 100, as previously described, the node arbitration processor 141 has prompted to supply data in response to the read request of processor. Namely, the data transfer sequencer 131 arranges the data buffer 133 to drive the data bus. The serial/parallel interface 166 converts the serial data into parallel data to output it to the data buffer 133 and at the same time to output the data reception detection signal 138 to the data transfer sequencer 131.

To assure the time for drive of data bus 151, the data transfer sequencer gives an instruction to drive an acknowledge signal to a control driver 132 after a certain delay and simultaneously prompts the node arbitration processor to produce and send an end packet, using part of data transmission reception request signal 149.

The node arbitration processor produces the transfer end packet having a header portion indicating the end of transfer, similarly as in the sending of connection request packet as described previously, and sends it to the arbiter.

Similarly as in the case of the above connection request packet, the arbiter 20 receives the transfer end packet, interprets it, changes the transfer line using state flag described previously into the usable state, and then turns into the idle state where it is ready for reception of next connection request.

By this, data on memory 202 in requested node 200 is supplied to the processor 101 in node 100.

For the write operation, substantially the same operation is carried out except that the direction of data transfer is reversed.

The same processing is also carried out for transmission between other nodes.

Although this example uses the light of wavelength $\lambda 1$ for arbitration signal lines 110, 210, 310 and the light of wavelength $\lambda 2$ for optical signals on connection line 10 in FIG. 3, no trouble would be caused in respect of structure even if $\lambda 1 = \lambda 2$.

Embodiment 3

Figure 11:
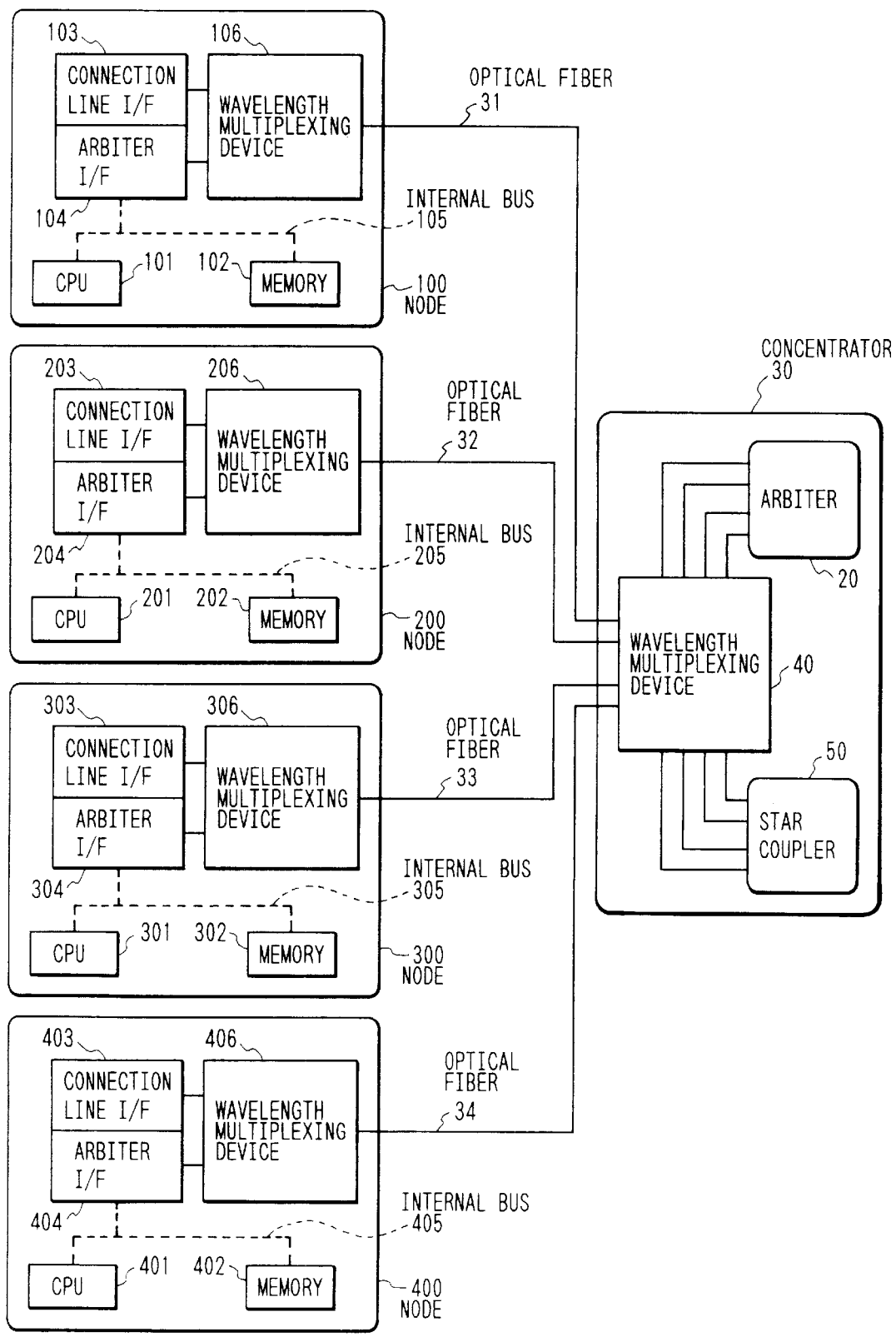
FIG. 11 is a drawing to show a layout of an entire system in embodiment 3 of the present invention.
Figure 12:
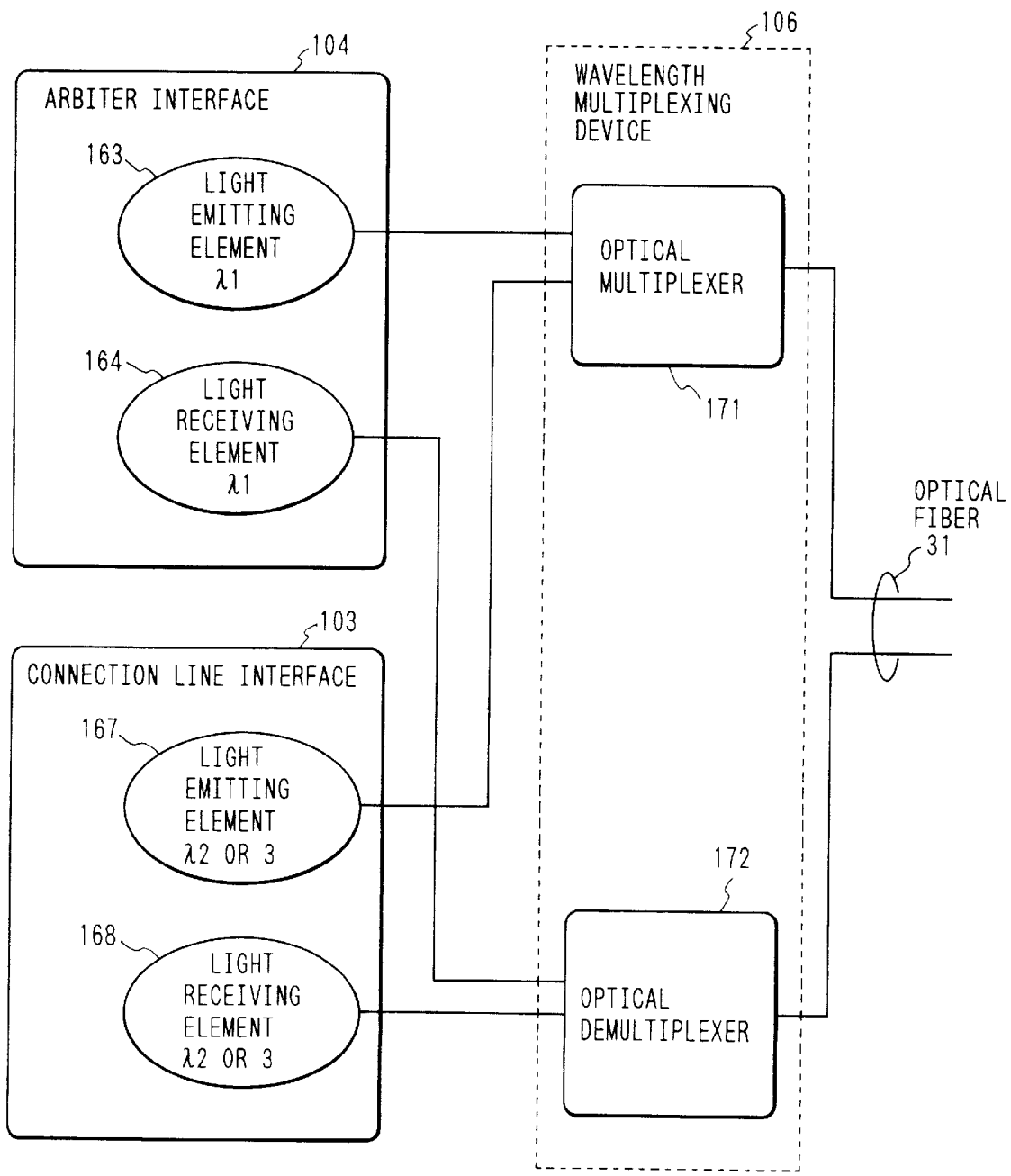
FIG. 12 is a drawing to show a layout of a wavelength-multiplexing apparatus in a node used in embodiment 3 of the present invention.
Figure 13:
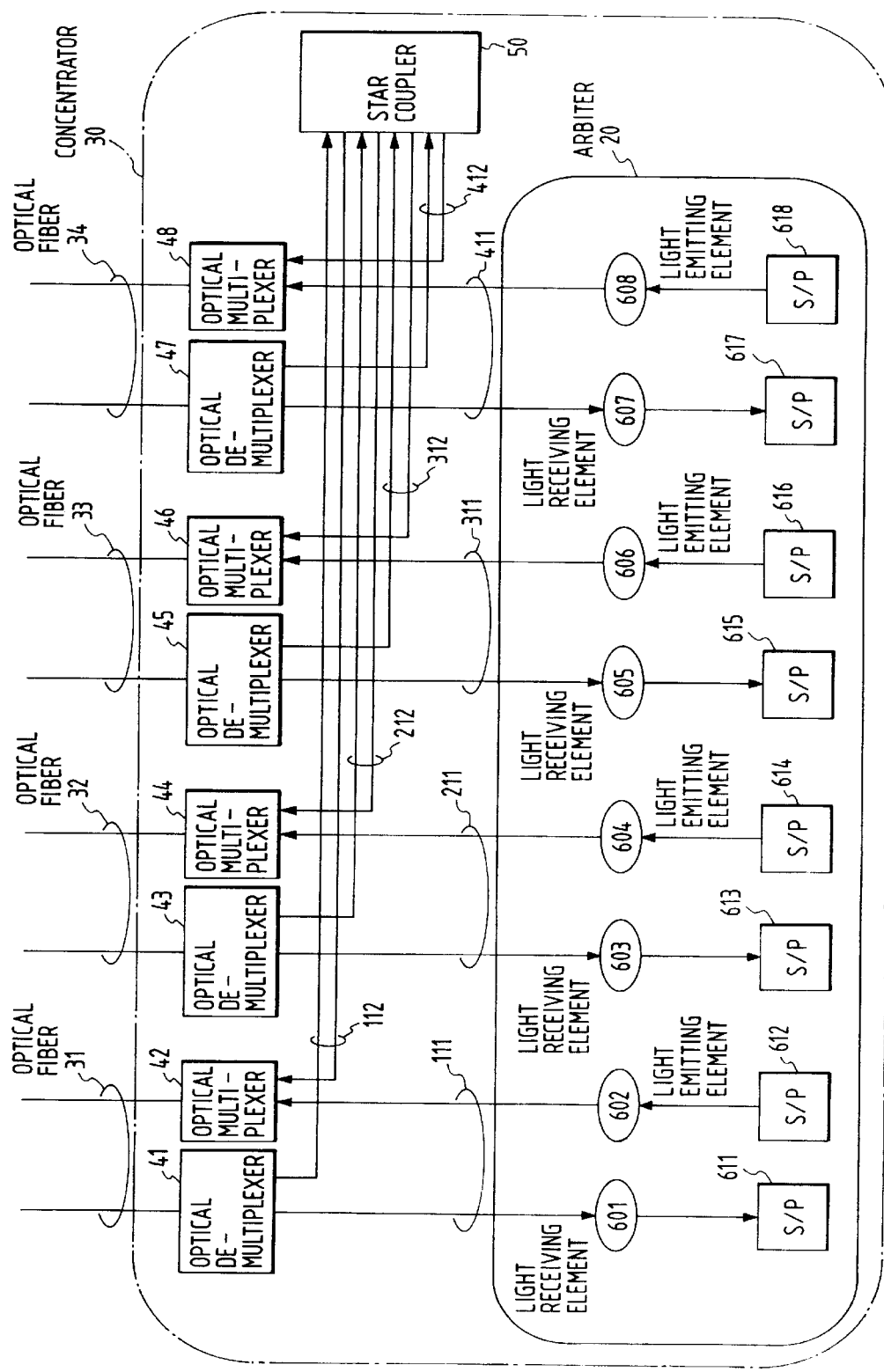
FIG. 13 is a drawing to show a layout of a concentrator in embodiment 3 of the present invention.

The previous examples were assumed to use physically separate signal lines for the arbitration signal lines 110, 210, 310 and the connection line 10 in FIG. 4, but a same signal line may be physically used for signals to pass as long as these lines can be separated from each other on a logical basis. FIG. 11 to FIG. 13 show an example of structure of such a case.

FIG. 11 is a drawing to show the structure of the entire system. Each node 100, 200, 300, 400 is connected to a concentrator 30 through a pair of optical fibers 31, 32, 33, 34. Optical signals, conventionally sent through two lines from each node, are wavelength-multiplexed inside each node to be output, and wavelength-demultiplexed at the entrance of concentrator 30 into light of arbitration wavelength $\lambda 1$ and light of data transmission wavelengths $\lambda 2$ and $\lambda 3$. Light re-distributed inside the concentrator is sent to each node and is separated at the entrance of node into original two lines to be internally utilized.

Here, the previous example used the light of wavelength $\lambda 1$ for optical signals on arbitration signal lines 110, 210, 310 and the light of wavelength $\lambda 2$ for optical signals on the connection line 10 in FIG. 3 while the arbitration signal lines and the connection line were arranged to be separate from each other. It was thus stated that the special case of $\lambda 1 = \lambda 2$ would be permissible. The example of FIG. 11, however, needs to satisfy the precondition that the wavelengths $\lambda 1$, $\lambda 2$, $\lambda 3$ are different from each other in order to prevent them from mixing with each other in wavelength multiplexing. Here, the four nodes use the mutually different wavelengths $\lambda 2$, $\lambda 3$ for data communication, whereby one-to-one communications through two lines can be simultaneously performed between two nodes. Designation of wavelength can be presented in the portion indicated as option in FIG. 9 from the arbiter to each node.

FIG. 12 is a drawing to show a layout of a node. The optical signals out of the light emitting elements 163, 167 and into the light receiving elements 164, 168 as shown in FIG. 6 and FIG. 10 are connected through an optical multiplexer 171 and an optical demultiplexer 172 to an optical fiber 31.

FIG. 13 shows a concentrator. The light coming through the optical fiber 31, 32, 33, 34 from each node is separated by an optical demultiplexer 41, 43, 45, 47 into an arbitration signal 111, 211, 311, 411 and a data transmission signal 112, 212, 312, 412. The arbitration signal is put into the arbiter portion shown in FIG. 8 to be utilized for arbitration. The data transmission signal is put into a star coupler to be distributed to the each node and thereafter is wavelength-multiplexed with a signal output from the arbiter by the optical multiplexer 42, 44, 46, 48 to be distributed to the each node.

As described above, according to the present invention, the node sends the additional information related to the data transfer to the arbiter through the arbitration signal line at the same time as the request for use of the connection line prior to the data transfer, and the arbiter sends these information to the destination node to be connected through the arbitration signal line upon setting of connection line, whereby the node receiving the request for connection can perform setting-up of line and preparation of data sent or received between nodes in an overlap manner. Therefore, the efficiency of data transfer after setting of connection line can be increased as compared with the cases where the additional information is sent through the circuit after setting of connection line.

What is claimed is:

1. An information processing apparatus, comprising:
   a plurality of nodes each having a respective memory, said plurality of nodes including at least a first node having a first memory and a second node having a second memory;

a connection line for connection between said plurality of nodes;

an arbiter for performing arbitration of use of said connection line; and an arbitration signal line for connection between said arbiter and each said node, said arbitration signal line being multiplexed with said connection line, wherein in order to perform data transfer between said first node and said second node using said connection line, said first node sends a use request requesting use of said connection line to said arbiter through said arbitration signal line and further sends to said arbiter, as additional information to be used by said second node at the time of the data transfer, at least one of first additional information indicating which data in one of said first and second memories corresponds to first data to be transmitted between said first and second nodes using said connection line, second additional information indicating a length of the first data, and third additional information indicating whether the memory from which the first data is to be read out is the first memory or the second memory, and when said arbiter permits use of said connection line based on the use request from said first node, said arbiter notifies said first node of the permission of use of said connection line and notifies said second node of the at least one of the first, second and third additional information.

2. An information processing apparatus according to claim 1, wherein said arbiter has means for separately storing the use request requesting use of the connection line and the at least one of the first, second and third additional information sent from said first node.

3. An information processing apparatus according to claim 1, wherein said additional information is information related to data transfer on said connection line, which is sent to the arbiter together with said request when each node requests to use the connection line to the arbiter.

4. An information processing apparatus according to claim 1, wherein said first additional information is an address of the first data.

5. An information processing apparatus according to claim 1, comprising an interface which handles a signal transmitted through said connection line and arbitration signal line in the form of a serial signal.

6. An information processing apparatus according to claim 1, wherein an address space is portioned out for the whole of said information processing apparatus.

7. An information processing apparatus according to claim 1, wherein each said node has at least one processor.

8. An information processing apparatus according to claim 1, wherein signals transmitted through said connection line and arbitration signal line are optical signals.

9. An information processing apparatus according to claim 8, wherein said connection line and arbitration signal line are wavelength-multiplexed and composed of a common optical fiber.

10. An information processing apparatus according to claim 9, wherein said connection line is connected through information distributing means with each node, said information processing apparatus further comprises a concentrator, and said information distributing means and said arbiter are set in said concentrator.

11. An information processing apparatus according to claim 10, wherein said information distributing means is a star coupler.

12. An arbitration method in an information processing apparatus having a plurality of nodes each having a respective memory, the plurality of nodes including at least a first node having a first memory and a second node having a second memory, the apparatus further having a connection line for connection between the plurality of nodes, an arbiter for performing arbitration of use of the connection line, and an arbitration signal line for connection between the arbiter and each node, the arbitration signal line being multiplexed with the connection line, said method comprising the steps of:

in order to perform data transfer between the first node and the second node using the connection line, sending a use request requesting use of the connection line and at least one of first additional information indicating which data in one of the first and second memories corresponds to first data to be transmitted between the first and second nodes using the connection line, second additional information indicating a length of the first data, and third additional information indicating whether the memory from which the first data is to be read out is the first memory or the second memory;

in the arbiter, performing arbitration of use of the connection line when the use request had been permitted; and sending the at least one of the first, second and third additional information to the second node.

13. An arbitration method according to claim 12, wherein the first additional information is an address of the first data.

14. An arbitration method according to claim 12, wherein an address space is portioned out for the whole of said information processing apparatus.

15. An information processing system, comprising:

a plurality of apparatuses, said plurality of apparatuses including at least a first apparatus and a second apparatus;

a third apparatus for performing arbitration of data transfer between said plurality of apparatuses;

a transmission line for transmitting data to be transferred between said first apparatus and said second apparatus, a request for data transfer and additional information related to the data to be transferred between said first apparatus and said second apparatus, wherein the additional information and the data to be transferred are transmitted using light of different wavelengths that are wavelength-multiplexed, and where a wavelength of light of the request and the additional information is different from a wavelength of light of the data to be transferred; and information distributing means, connected to said transmission line, for distributing data transferred from said plurality of apparatuses, wherein said first apparatus includes means for transferring the request and the additional information to said third apparatus via said transmission line after the request occurs, and said third apparatus includes means for notifying said first apparatus of permission for the data transfer when said third apparatus permits the request.

16. An information processing system according to claim 15, wherein each of said plurality of apparatuses includes a respective memory, and each memory is mapped onto a common address space of said plurality of apparatuses.

17. An information processing system, comprising:

a plurality of apparatuses, said plurality of apparatuses including at least a first apparatus and a second apparatus;

a concentrator including a third apparatus for performing arbitration of data transfer between said plurality of apparatuses; and a transmission line for transmitting data to be transferred between said first apparatus and said second apparatus and a request for data transfer, said concentrator further including information distributing means, connected to said transmission line, for distributing data to be transferred to said plurality of apparatuses, wherein said first apparatus includes means for transferring the request and additional information related to the data to be transferred between said first apparatus and said second apparatus to said third apparatus via said transmission line after the request occurs, and said third apparatus includes means for notifying said first apparatus of permission for the data transfer when said third apparatus permits the request.

18. An arbitration method in an information processing system having a plurality of apparatuses including at least a first apparatus and a second apparatus, a third apparatus for performing arbitration of data transfer between the plurality of apparatuses, and a transmission line for transmitting data to be transferred between the first apparatus and the second apparatus, a request for data transfer and additional information related to the data to be transferred between the first apparatus and the second apparatus, where information distributing means for distributing data transferred from said plurality of apparatuses is connected to the transmission line, said method comprising the steps of:

in the first apparatus, sending the request to the third apparatus via the transmission line after the request occurs;

in the first apparatus, transmitting the additional information to the third apparatus via the transmission line after the request occurs, wherein the additional information and the data to be transferred are transmitted using light of different wavelengths that are wavelength-multiplexed, and where a wavelength of light of the request and the additional information is different from a wavelength of light of the data to be transferred; and in the third apparatus, notifying the first apparatus of permission for the data transfer when the third apparatus permits the request.

19. A method according to claim 18, wherein each of the plurality of apparatuses includes a respective memory, and each memory is mapped onto a common address space of the plurality of apparatuses.

20. An arbitration method in an information processing system, said method comprising the steps of:

in a first apparatus of the system, the system having a plurality of apparatuses including at least the first apparatus and a second apparatus, a concentrator including a third apparatus for performing arbitration of data transfer between the plurality of apparatuses, and a transmission line for transmitting data to be transferred between the first apparatus and the second apparatus and a request for data transfer, the concentrator further including information distributing means, connected to the transmission line, for distributing data to be transferred to the plurality of apparatuses, sending the request to the third apparatus via the transmission line after the request occurs;

in the first apparatus, transmitting additional information related to the data to be transferred between the first apparatus and the second apparatus to the third apparatus via the transmission line after the request occurs; and in the third apparatus, notifying the first apparatus of permission for the data transfer when the third apparatus permits the request.

21. An information processing system, comprising:

a plurality of apparatuses, said plurality of apparatuses including at least a first apparatus and a second apparatus;

a third apparatus for performing arbitration of data transfer between said plurality of apparatuses;

a transmission line for transmitting data to be transferred between said first apparatus and said second apparatus, a request for use of said transmission line and additional information related to the data to be transferred between said first apparatus and said second apparatus, wherein the additional information and the data to be transferred are transmitted using light of different wavelengths that are wavelength-multiplexed, and where a wavelength of light of the request and the additional information is different from a wavelength of light of the data to be transferred; and information distributing means, connected to said transmission line, for distributing data transferred from said plurality of apparatuses, wherein said first apparatus includes means for outputting the request and the additional information to said transmission line after the request occurs, and said second apparatus includes means for processing the additional information.

22. An information processing system according to claim 21, wherein each of said plurality of apparatuses includes a respective memory, and each memory is mapped onto a common address space of said plurality of apparatuses.

23. An information processing system, comprising:

a plurality of apparatuses, said plurality of apparatuses including at least a first apparatus and a second apparatus;

a concentrator including a third apparatus for performing arbitration of data transfer between said plurality of apparatuses; and a transmission line for transmitting data to be transferred between said first apparatus and said second apparatus and a request for use of said transmission line, said concentrator further including information distributing means, connected to said transmission line, for distributing data to be transferred to said plurality of apparatuses, wherein said first apparatus includes means for outputting the request and additional information related to the data to be transferred between said first apparatus and said second apparatus to said transmission line after the request occurs, and said second apparatus includes means for processing the additional information.

24. A communication method in an information processing system having a plurality of apparatuses including at least a first apparatus and a second apparatus, a third apparatus for performing arbitration of data transfer between the plurality of apparatuses, and a transmission line for transmitting data to be transferred between the first apparatus and the second apparatus, a request for use of the transmission line and additional information related to the data to be transferred between the first apparatus and the second apparatus, where information distributing means for distributing data transferred from the plurality of apparatuses is connected to the transmission line, said method comprising the steps of:

in the first apparatus, outputting the request to the third apparatus via the transmission line after the request occurs;

in the first apparatus, outputting the additional information to the transmission line after the request occurs, wherein the additional information and the data to be transferred are transmitted using light of different wavelengths that are wavelength-multiplexed, and where a wavelength of light of the request and the additional information is different from a wavelength of light of the data to be transferred; and in the second apparatus, processing the additional information after the third apparatus permits the request.

25. A method according to claim 24, wherein each of the plurality of apparatuses includes a respective memory, and each memory is mapped onto a common address space of the plurality of apparatuses.

26. A communication method in an information processing system, said method comprising the steps of:

in a first apparatus of the system, the system having a plurality of apparatuses including at least the first apparatus and a second apparatus, a concentrator including a third apparatus for performing arbitration of data transfer between the plurality of apparatuses, and a transmission line for transmitting data to be transferred between the first apparatus and the second apparatus and a request for use of the transmission line, the concentrator further including information distributing means, connected to the transmission line, for distributing data to be transferred to the plurality of apparatuses, outputting the request to the transmission line after the request occurs;

in the first apparatus, outputting additional information related to the data to be transferred between the first apparatus and the second apparatus to the transmission line after the request occurs; and in the second apparatus, processing the additional information.

27. An information processing system, comprising:

a plurality of apparatuses, said plurality of apparatuses including at least a first apparatus and a second apparatus;

a third apparatus for performing arbitration of data transfer between said plurality of apparatuses;

a transmission line for transmitting data to be transferred between said first apparatus and said second apparatus, a request for use of said transmission line and additional information related to the data to be transferred between said first apparatus and said second apparatus, wherein the additional information and the data to be transferred are transmitted using light of different wavelengths that are wavelength-multiplexed, and where a wavelength of light of the request and the additional information is different from a wavelength of light of the data to be transferred; and information distributing means, connected to said transmission line, for distributing data transferred from said plurality of apparatuses, wherein said first apparatus includes means for outputting the request and the additional information to said transmission line prior to transferring the data to be transferred.

28. An information processing system according to claim 27, wherein each of said plurality of apparatuses includes a respective memory, and each memory is mapped onto a common address space of said plurality of apparatuses.

29. An information processing system, comprising:

a plurality of apparatuses, said plurality of apparatuses including at least a first apparatus and a second apparatus;

a concentrator including a third apparatus for performing arbitration of data transfer between said plurality of apparatuses; and a transmission line for transmitting data to be transferred between said first apparatus and said second apparatus and a request for use of said transmission line, said concentrator further including information distributing means, connected to said transmission line, for distributing data to be transferred to said plurality of apparatuses, wherein said first apparatus includes means for outputting the request and additional information related to the data to be transferred between said first apparatus and said second apparatus to said transmission line prior to transferring the data to be transferred.

30. A communication method in an information processing system having a plurality of apparatuses including at least a first apparatus and a second apparatus, a third apparatus for performing arbitration of data transfer between the plurality of apparatuses, and a transmission line for transmitting data to be transferred between the first apparatus and the second apparatus, a request for use of the transmission line and additional information related to the data to be transferred between the first apparatus and the second apparatus, where information distributing means for distributing data transferred from the plurality of apparatuses is connected to the transmission line, said method comprising the steps of:

in the first apparatus, outputting the request and the additional information to the transmission line prior to transferring the data to be transferred, wherein the additional information and the data to be transferred are transmitted using light of different wavelengths that are wavelength-multiplexed, and where a wavelength of light of the request and the additional information is different from a wavelength of light of the data to be transferred; and in the second apparatus, processing the additional information after the third apparatus permits the request.

31. A method according to claim 30, wherein each of the plurality of apparatuses includes a respective memory, and each memory is mapped onto a common address space of the plurality of apparatuses.

32. A communication method in an information processing system, said method comprising the steps of:

in a first apparatus of the system, the system having a plurality of apparatuses including at least the first apparatus and a second apparatus, a concentrator including a third apparatus for performing arbitration of data transfer between the plurality of apparatuses, and a transmission line for transmitting data to be transferred between the first apparatus and the second apparatus and a request for use of the transmission line, the concentrator further including information distributing means, connected to the transmission line, for distributing data to be transferred to the plurality of apparatuses, outputting the request to the transmission line prior to transferring the data to be transferred; and outputting additional information related to the data to be transferred between the first apparatus and the second apparatus to the transmission line prior to transferring the data to be transferred.

33. An information processing system, comprising:

a plurality of nodes each having a respective memory and each memory being mapped onto a common address space of said plurality of nodes, said plurality of nodes including at least a first node and a second node;

a communication line for connecting said plurality of nodes to each other; and a third node for controlling data transfer between said first and second nodes, wherein said first node transfers first data and second data to said third node, the first data indicating a request for connection of said communication line between said first and second nodes and the second data indicating a part of said common address space, wherein said third node sets the connection between said first and second nodes and notifies said first and second nodes that said communication line is connected, and wherein said communication line uses a first light signal to transfer the data to be transferred, wherein a wavelength of the first light signal is different from a wavelength of a second light signal used by said communication line and the first and second light signals are wavelength multiplexed.

34. An information processing system according to claim 33, wherein said communication line uses the second light signal to transfer the first data and the second data.

35. An information processing system according to claim 34, wherein the second data is transferred with the first data.

36. An information processing system according to claim 33, wherein said third node executes arbitration of said transmission line.

37. An information processing system according to claim 33, wherein said third node transfers data from each one of said plurality of nodes to each other of the plurality of nodes.

38. A communication method in an information processing system including a plurality of nodes each having a respective memory and each memory being mapped onto a common address space of the plurality of nodes, the plurality of nodes including at least a first node and a second node, the system further including a communication line for connecting the plurality of nodes to each other, and a third node for controlling data transfer between the first and second nodes, said method comprising the steps of:

in the first node, transferring first data and second data to the third node, the first data indicating a request for connection of the communication line between the first and second nodes and the second data indicating a part of the common address space, in the third node, setting the connection between the first and second nodes and notifying the first and second nodes that the communication line is connected, and in the communication line, using a first light signal to transfer the data to be transferred, a wavelength of the first light signal is different from a wavelength of a second light signal used by the communication line, and the first and second light signals are wavelength multiplexed.

39. An information processing apparatus comprising:

managing means for managing a common address space, where a first memory in a first node and a second memory in a second node are each mapped onto a part of the common address space;

setting means for receiving, from the first node, first data requiring a connection, using a communication line, of the first and second nodes and second data designating the part of the common address space, said setting means setting the connection of the first and second nodes in response to the first and second data; and output means for informing the first and second nodes of the connection via a communication line, wherein the communication line uses a first light signal to transfer data to be transferred between the first and second nodes, a wavelength of the first light signal is different from a wavelength of a second light signal used by the communication line, and the first and second light signals are wavelength multiplexed.

40. A system according to claim 17, wherein the request is transmitted using a first light signal and the data to be transferred is transmitted using a second light signal, a wavelength of the first light signal being different from a wavelength of the second light signal.

41. A method according to claim 20, wherein the request is transmitted using a first light signal and the data to be transferred is transmitted using a second light signal, a wavelength of the first light signal being different from a wavelength of the second light signal.

42. A system according to claim 23, wherein the request is transmitted using a first light signal and the data to be transferred is transmitted using a second light signal, a wavelength of the first light signal being different from a wavelength of the second light signal.

43. A method according to claim 26, wherein the request is transmitted using a first light signal and the data to be transferred is transmitted using a second light signal, a wavelength of the first light signal being different from a wavelength of the second light signal.

44. A system according to claim 29, wherein the request is transmitted using a first light signal and the data to be transferred is transmitted using a second light signal, a wavelength of the first light signal being different from a wavelength of the second light signal.

45. A method according to claim 32, wherein the request is transmitted using a first light signal and the data to be transferred is transmitted using a second light signal, a wavelength of the first light signal being different from a wavelength of the second light signal.

46. A method according to claim 38, wherein the communication line uses the second light signal to transfer the first data and the second data.

47. A method according to claim 46, wherein the second data is transferred with the first data.

48. An apparatus according to claim 34, wherein the communication line uses the second light signal to transfer the first data and the second data.

49. An apparatus according to claim 48, wherein the second data is transferred with the first data.

* * * * *

UNITED STATES PATENT AND TRADEMARK OFFICE
CERTIFICATE OF CORRECTION

PATENT NO. : 6,009,490
DATED : December 28, 1999
INVENTOR(S) : Toshiyuki Fukui

It is certified that error appears in the above-identified patent and that said Letters Patent is hereby corrected as shown below:

Title page, item [57] ABSTRACT

Line 18, "being" should read --which is to--.

SHEET 10

FIG. 10, "ELEMEMN" should read --ELEMENT--.

COLUMN 4

Line 28, "connection line 110." should read --arbitration signal line 110.--.

COLUMN 16

Line 52, "claim 34," should read --claim 39,--.

Signed and Sealed this

Sixth Day of February, 2001

Attest:

Q. TODD DICKINSON

*Attesting Officer*     *Director of Patents and Trademarks*